United States Patent [19]

Keener et al.

[11] Patent Number: 4,540,891
[45] Date of Patent: Sep. 10, 1985

[54] HIGH CURRENT FLOAT SWITCH

[75] Inventors: Robert M. Keener, Ashland; Shekhar Chakrawarti, Strongsville, both of Ohio

[73] Assignee: R. W. Beckett Corporation, N. Ridgeville, Ohio

[21] Appl. No.: 548,106

[22] Filed: Nov. 2, 1983

[51] Int. Cl.³ .............................................. H01H 35/18
[52] U.S. Cl. .................................. 307/118; 200/84 R; 340/625
[58] Field of Search ................ 200/84 R, 84 B, 230; 307/118; 361/178; 340/623, 624, 625

[56] References Cited

U.S. PATENT DOCUMENTS

| 3,309,687 | 3/1967 | Phipps | 200/84 B X |
| 3,621,168 | 11/1971 | Durand | 200/84 B |
| 3,944,845 | 3/1976 | Luteran | 307/118 |
| 4,262,216 | 4/1981 | Johnston | 361/178 X |
| 4,320,394 | 3/1982 | John, Jr. | 200/84 C X |

Primary Examiner—G. P. Tolin
Attorney, Agent, or Firm—Pollock, Vande Sande & Priddy

[57] ABSTRACT

A float switch for providing a switching path for a high level electric current in response to a fluid level. A buoyant float housing includes a pair of conductors through the housing which are adapted to receive a potential difference. A high current solid state switching device in the housing provides a current path between the conductors inside the housing. The solid state switching device is mounted to a heat sink cup exposed through an opening in the float housing to the fluid level. A wide angle mercury switch is provided to trigger the solid state switching device in response to a change in the float housing orientation.

9 Claims, 4 Drawing Figures

HIGH CURRENT FLOAT SWITCH

The present invention relates to high current float switches. Specifically, a high current high reliability solid state float switch is described.

Many industrial applications require level sensing of a fluid such as in sewage systems, sump systems and chemical transfer pumping. Pump motor switching necessarily requires switch contacts which can handle, over time, appreciable motor currents. The most widely accepted technique for switching pumps into operation employs the use of a buoyant float which houses a wide angle omnidirectional mercury capsule switch. With this type of float switch, the float is tethered usually by the cable carrying the switched conductors to a tether point. As the level of fluid supporting the float rises, the mercury switch becomes oriented in a position where the mercury provides a connection between contacts of the switch. The closed contacts then provide a switching path for the attached cable conductors which supplies current to the pumping motor. As the fluid level pumps down, the mercury switch contacts open, interrupting the motor current.

The wide angle mercury switches used in these applications rapidly deteriorate due to the high currents which are switched. The high currents produce arcing within the mercury switch capsule. The arcing deteriorates the mercury mobility, and adhesion to the capsule walls results, producing erratic switching. The result can therefore be a burnt out motor or flooding.

SUMMARY OF THE INVENTION

It is a primary object of this invention to provide high current switching in a float switch with improved reliability.

It is another object of this invention to provide solid state switching in a float switch which has a high degree of immunity to false triggering due to transients.

It is a further object of this invention to provide solid state switching for a float switch which has efficient heat transfer with the float switch exterior for extended life.

These and other objects are provided by a float switch in accordance with the invention. A buoyant float is provided with a solid state semiconductor switch terminating a pair of conductors. The semiconductor switch is maintained in efficient heat transfer relationship with the pumping environment to permit adequate cooling. A wide angle mercury switch is used to trigger the semiconductor switch into conduction as the float position changes.

In one embodiment of the invention, a buoyant float is provided with a central cavity extending through the float for supporting a circuit board. A circuit board including a wide angle mercury switch and a triac is supported in the cavity. One end of the cavity is closed by a heat sink cup to which a heat transfer surface of the triac is mounted. The remaining end of the cavity receives a cable bearing first and second conductors which terminate the main terminals of the triac. The triac gate terminal is connected to a main terminal through a wide angle mercury switch. The mercury switch provides omnidirectional switching capability to the switch system and also produces arcless on/off switching of the triac gate with a high immunity to false triggering.

DESCRIPTION OF THE PREFERRED EMBODIMENT

Figure 1:
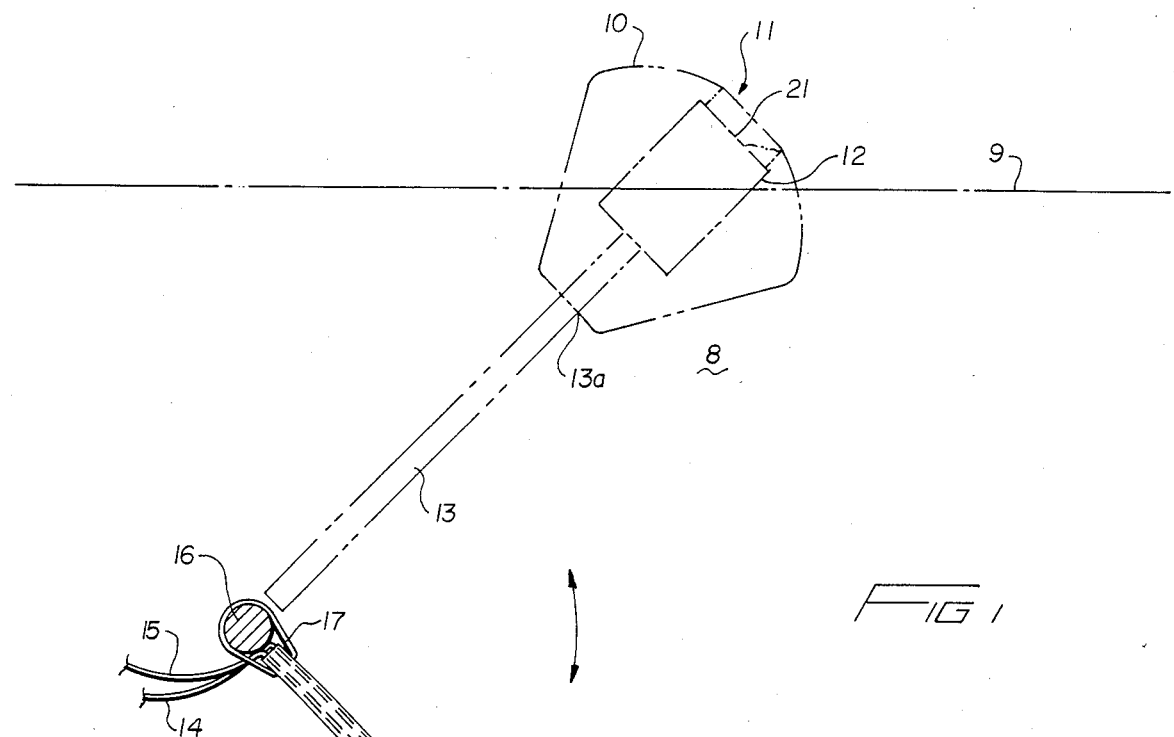
FIG. 1 is a side view of a preferred embodiment of the float switch pumping a fluid level.

Referring now to FIG. 1, there is shown a float switch assembly 8 disposed at first and second fluid levels 9. The float switch assembly 8 is tethered at a pivot point 16, such that when fluid level 9 rises, the float will swing from its lowermost position to its uppermost position. The float switch assembly 8 is activated by a change in its angular position with respect to the tether point by the closure of an angular position sensitive switch in the float switch assembly 8.

The float switch comprises a molded buoyant housing 10, including a central cavity 11. Central cavity 11 is partitioned by surface 21, serving as a heat sink for electronic components contained within the cavity 11. A cable 13 is sealingly connected with the buoyant float housing 10 and carries two conductors 14 and 15.

Figure 2:
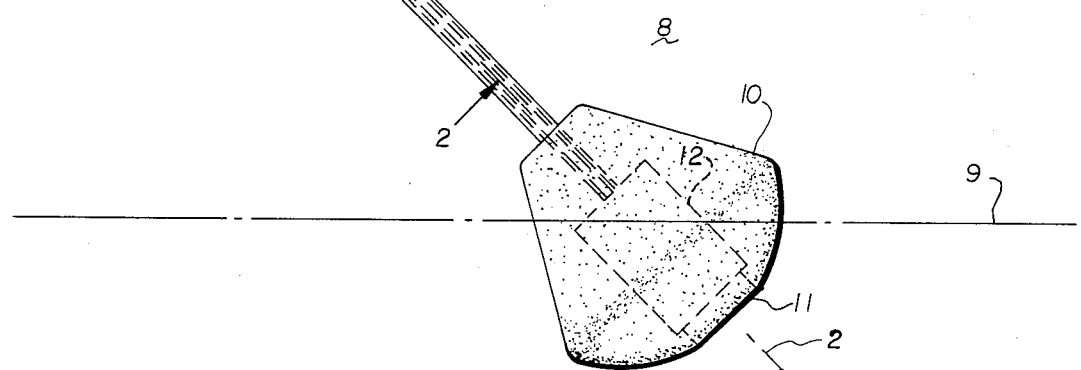
FIG. 2 is a section view of the float switch.
Figure 2:
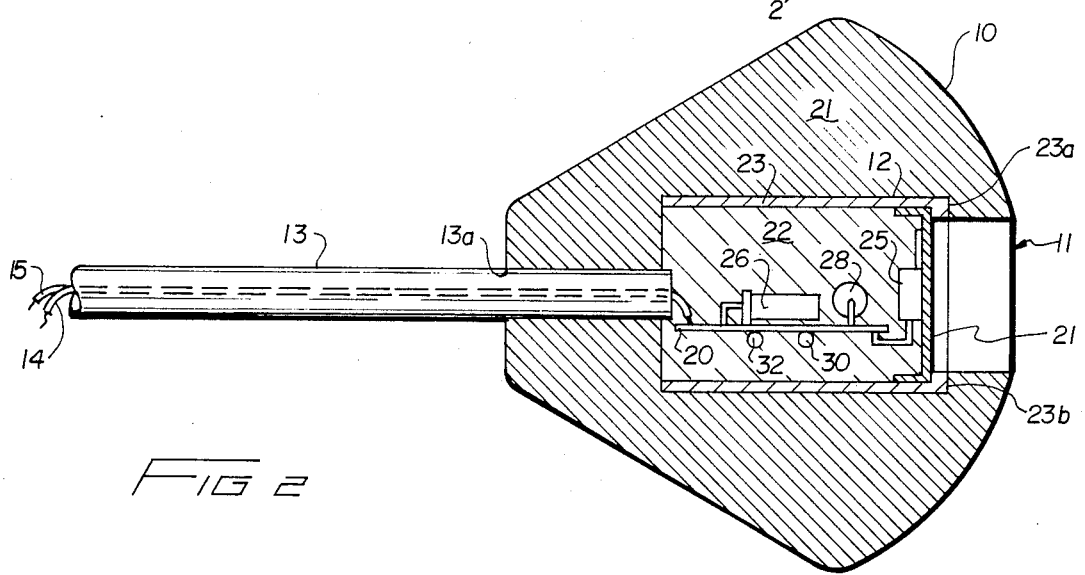

Referring now to FIG. 2, there is shown a section view of the float switch assembly 8. The float housing 10 is molded with a plastic molding foam material 21 which makes the float switch buoyant. The foam material 21 may be a structural polyurethane foam, molded around a cup assembly 23. Cup assembly 23 has flange ends 23a and 23b, and itself includes a printed circuit assembly 20, and a suitable potting compound of an epoxy material.

The cup member 23 has the end portion bearing flanges 23a and 23b sealed by a heat sink member 21. Thus, the cavity 11 is sealed against fluid penetration.

Figure 3:
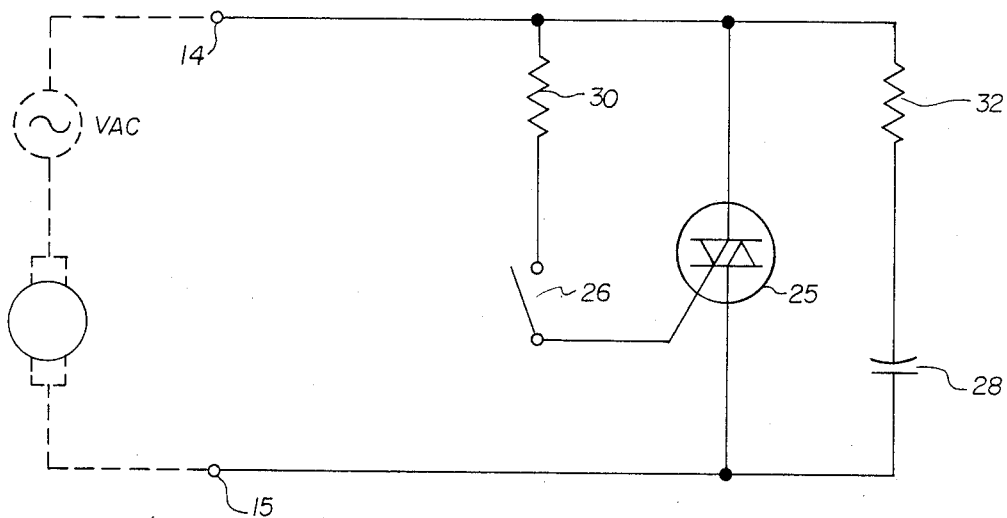
FIG. 3 is an electrical schematic drawing of the float switch of FIG. 1.
Figure 4:
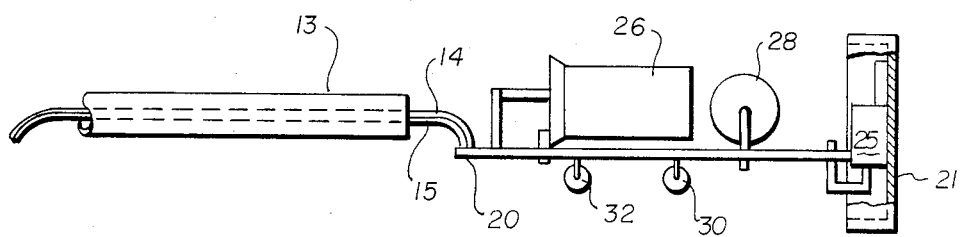
FIG. 4 is a side view of the printed circuit board assembly 20.

Printed circuit board assembly 20 can be seen more clearly in FIG. 4, wherein the printed circuit board assembly 20 is seen to contain a plurality of electric circuit components, which will be more clearly described with respect to FIG. 3. The heat sink member 21 is bonded to the surface of a semiconductor switching device 25 to be also more clearly described with respect to FIG. 3. This is done for structural strength and added heat transfer. The printed circuit assembly of FIG. 4 also contains connections to conductors 14 and 15 of cable 13. With the conductors 14 and 15 so connected, the printed circuit assembly 20 is inserted with the attached heat sink 21 in cup 23. In practice, the side walls of cup 23 have a slight 1° taper towards the flanges 23a.

The cup 23, printed circuit assembly 20 and attached cable 13 are then potted in place with the epoxy potting compound 22, familiar to those skilled in the circuit manufacture art. The epoxy potting compound 22 is permitted to set and harden.

The epoxied assembly is next provided with a molded polyurethane foam float around it using an injection molding process. The float contains an aperture in line with cup 23 whereby the heat sink 21 remains exposed to the pumped liquid. Aperture 11 is provided to permit fluid contact with the heat sink 21.

Referring to FIG. 3, the electrical operation of the device can be described. A triac 25 provides a connection between conductors 14 and 15 upon the closure of wide angle mercury switch 26. Mercury switch 26 may be of the type manufactured by Mercury Displacement Industries, identified as their WATS-1 wide angle tilt switch. Switch 26 provides a closure, when it is oriented approximately 135° from a vertical position, as shown more particularly in the data sheet provided by Mercury Displacement Industries, Inc. The float switch 26, when closed, provides a potential applied to the free end of conductor 14 sufficient to gate triac 25 into a conducting condition. Those skilled in the art will recognize that conductor 14 is ultimately connected to a source of potential for energizing a motor, and conductor 15 is connected to a motor terminal, and a path is closed between the potential source connected to conductor 14 and the motor upon energization of triac 25. A gate circuit limiting resistor 30 is provided to reduce the gate current to an acceptable level.

Resistor 32 and capacitor 28 provide for a conventional snubber circuitry, designed such that undesirable switches due to steep transients are reduced to a minimum.

In operation, the float switch assembly 8 of FIG. 1 will provide an omnidirectional indication of the float level. Thus, in the event the float switch assembly 8 moves into any plane coincident with the level 9, the operation of the switch will not be affected by rotation of the float around its own axis 2 because of the omnidirectional nature of the mercury switch 26. During operation, the fluid level 9 will be exposed to the heat sink 21 and some fluid will remain in the cavity portion 11 which is open to the pumped fluid level at all times. The exposure of heat sink 21 to the fluid level and ambient air will provide for cooling of the triac during the conduction of heavy pumping motor currents. Thus, it is seen that the float switch assembly 8 provides for high level current switching directly without the addition of other switching or relay circuits operative in response to the float switch assembly 8.

By employing the wide angle mercury switch 26 in the gate circuit of triac 25, it is possible to increase the life of the mercury switch 26 because of the small gate current requirements. Further, the exposure of triac 25 to the fluid surface 9 and to any residual fluid which remains in cavity 11, will permit the device to remain sufficiently cool for an increased float switch life. The wide angle mercury switch provides for high noise immunity against false triggering of triac 25.

Thus, there has been described a float switch which will provide for high current switching in response to fluid level changes. Those skilled in the art will recognize yet other embodiments described more particularly by the claims which follow.

What is claimed is:

1. A float switch for providing a switching path for a high level electric current in response to a fluid level comprising:
   a buoyant float housing having a pair of conductors extending through said housing, to provide first and second connection ends for said switching path adapted to receive a potential difference;
   a high current solid state switching device inside said housing connected to a heat transfer surface exposed through an aperture of said housing; said device providing a current path between said conductors inside said housing; and
   an annular position sensor connected to said switching device, said sensor connected to trigger said switching device into a conducting state in response to a position change of said float, whereby said switching device passes a current between said conductors.

2. The float switch of claim 1 wherein said high current solid state switching device is a triac.

3. The float switch of claim 2 wherein said level sensor is a mercury switch supported in said housing, and connected between a trigger electrode of said triac and a main terminal of said triac.

4. The float switch of claim 3 further comprising a transient suppression circuit connected across said triac main terminals.

5. A float switch for providing a switching path for a high level current in response to a fluid level comprising:
   a buoyant float housing supporting an electric circuit comprising:
   a triac having first and second main terminals and a trigger terminal;
   a mercury switch connected between one of said main terminals and said trigger terminal, said mercury switch closing in response to a position change of said float housing; said triac mounted to a heat transfer surface exposed through an aperture in said float housing to said fluid level, for transferring heat from said triac; and
   a pair of conductors, each connected to a main terminal of said triac through a sealed opening in said buoyant float housing, said conductor pairs adapted to be connected to a potential source and motor connection, whereby a current path is established through said conductors and triac in response to a position change of said buoyant float housing.

6. The float switch of claim 5 wherein said mercury switch is omnidirectional.

7. A level activated switch for providing a current switching path in response to a fluid level change comprising:
   a buoyant float member having a central cavity extending through a first and second aperture in said float member;
   a circuit disposed within said cavity including: a semiconductor switch having a heat transfer surface, an angular position sensitive switch connected to trigger said semiconductor switch, and first and second conductors serially connected by said semiconductor switch, said conductors exiting through said second aperture in said buoyant float member; and
   a heat sink cup for sealing said first aperture, said cup supporting said semiconductor switch in heat transfer relationship with said buoyant float member exterior, whereby said cavity is sealed against said fluid level.

8. The apparatus of claim 7 wherein said semiconductor switch is a triac.

9. The level actuated switch of claim 7 wherein said angular position sensitive switch is omnidirectional and immune to rotational changes in said buoyant float member.

* * * * *

UNITED STATES PATENT AND TRADEMARK OFFICE
CERTIFICATE OF CORRECTION

PATENT NO. : 4,540,891
DATED : September 10, 1985
INVENTOR(S) : Keener et al

It is certified that error appears in the above—identified patent and that said Letters Patent are hereby corrected as shown below:

In Claim 1, Column 4, line 1 of said column, "annular" should read -angular-.

Signed and Sealed this

Twenty-sixth Day of November 1985

[SEAL]

Attest:

DONALD J. QUIGG

Attesting Officer

Commissioner of Patents and Trademarks